United States Patent [19]

Lee

[11] Patent Number: 4,597,149

[45] Date of Patent: Jul. 1, 1986

[54] MANDREL FOR FORMING AN INTERNAL ENLARGEMENT FOR A GASKET OR SEALING RING IN A PIPE OR TUBE

[76] Inventor: Robert J. Lee, 810 E. 80th St., Indianapolis, Ind. 46240

[21] Appl. No.: 782,108

[22] Filed: Sep. 30, 1985

[51] Int. Cl.$^4$ .............................................. B29C 17/00
[52] U.S. Cl. ....................................... 29/235; 425/392
[58] Field of Search ............. 425/392, 393, DIG. 218; 264/296, 313; 29/235

[56] References Cited

U.S. PATENT DOCUMENTS

| | | | |
|---|---|---|---|
| 3,998,578 | 12/1976 | Acda | 425/393 |
| 4,234,301 | 11/1980 | Hayes et al. | 425/392 |
| 4,386,045 | 5/1983 | Vaisanen | 425/393 |
| 4,430,052 | 2/1984 | Olsson | 425/392 |

FOREIGN PATENT DOCUMENTS

83423  5/1982  Japan .................................. 425/392

*Primary Examiner*—Lowell A. Larson
*Attorney, Agent, or Firm*—Robert A. Spray

[57] ABSTRACT

A mandrel device which guides the end of a pipe or tube to a position outwardly of the path of an expander body, with a camming mechanism to force the expander body from an inward position to an outward position, and holding that outward position so as to achieve the desired gasket-receiving enlargement of the tubular work object. In a subsequent stage, another camming feature forces the expander body radially inwardly, to permit the tubular work object, now carrying the sealing ring in a position which would mean interference by the expander body, to be released over the end of the mandrel. The two camming components are carried by sub-assemblies axially movable with respect to stationary parts of the mandrel; and they are interrelated to have both movement together and movement with respect to one another, achieving the outward and inward camming effects in a plural-stage motion sequence and nature.

21 Claims, 4 Drawing Figures

FIG. 3

FIG. 4

MANDREL FOR FORMING AN INTERNAL ENLARGEMENT FOR A GASKET OR SEALING RING IN A PIPE OR TUBE

FIELD OF INVENTION

The present invention relates to a device or mechanism by which an enlargement is imparted to the inner surface of a pipe or tube, for accepting and retaining a gasket or sealing ring member by which the juncture of two such pipes is sealed.

More particularly, the concepts of the invention relate to, and provide, a mandrel device which receives the end of the pipe or tube and has an expandable body means which push outwardly against the pipe or tube work-object to achieve the formation of the desired enlargement (the work object having been initially warmed so as to accept the tube-forming effect), and then causes the outwardly-pushing body means to retract to permit release of the pipe or tube.

SUMMARY OF THE INVENTION

According to the concepts of the invention, an outer nose member of a mandrel accepts a free end of a pipe or tube work object, and guides it to a location outwardly of the location of an outwardly-movable and circumferential shoe means which provides the force of a body against the interior of the tubular work object. A cam device causes a camming-out effect on the shoe means, by which the shoe means is caused to be disposed outwardly of the diameter of that of the device's outer nose; thus, as the tubular work object is forced past that location, the tubular workpiece is forced to a larger diametrical size to accept a gasket or sealing ring near its end.

In an initial stage of the operativity cycle, the nose component overlies the shoe means, as a situation incident to the previous cycle, but nose-moving means cause the nose member to move axially outwardly of the mandrel to uncover the shoe means for its pipe-expanding operativity or actuation. However, after the workpiece pipe has been processed, those same moving means pull the nose member back to its initial position; and, in so doing, the nose member cams the expander shoe means radially inwardly to its initial radial-inward position permitting the tubular workpiece, now carrying its sealing ring, to be withdrawn from the mandrel because the shoe means at that stage no longer occupies the place which would block the travel of the sealing ring, i.e., no longer occupies a region radially outwardly of the diameter of the tubular workpiece axially outwardly of the location of installation of the seal ring in the tubular work object.

The expandable body means and the nose-moving means are supported to have motion both with one another, and with respect to one another, at different stages of the work-cycle; and that duality of motion relative to the stationary mandrel body provides advantageous operational features.

The above description is of somewhat introductory and generalized form. More particular details, concepts, and features are set forth in the following and more detailed description of a preferred but illustrative embodiment, taken in conjunction with the accompanying drawings.

BRIEF DESCRIPTION OF THE DRAWINGS

The drawings are of somewhat of a generally schematic or diagrammatic nature for illustrating the inventive concepts; and in the drawings:

FIGS. 2 and 3 both show chain lines, used to contrast the position from a previous position or positions. Also in FIG. 3 for diagrammatic ease of showing the mandrel's operativity, there are shown as superimposed onto FIG. 3 sequential positions of the pioe or tube work object. They are as follows: The rightward showing of the pipe or tube 14, noted as 14a is as it approaches the mandrel; the intermediate showing, noted as 14b, is as it has been moved onto the mandrel and is being given its initial enlargement; and the third showing, noted as 14c, is with the pipe or tube leftwardly against an abutment stop not only after the pipe or tube has been moved to that position but after the additional desired internal diameter-enlargement has been formed therein, and the gasket or sealing ring installed.

Further as to FIGS. 1–3, in considering subsequent stages of operativity, FIG. 2 could be considered as showing a cycle stage subsequent to FIG. 3 with the outwardly-camming effect having been removed; however the expander body would not have retracted as fully as shown in FIG. 2. FIG. 1, however, could be considered as illustrating the parts as at the subsequent end of that cycle as well as at the beginning of the next cycle, without such an exception.

DETAILED DESCRIPTION OF THE ILLUSTRATIVE EMBODIMENT

Figure 3:
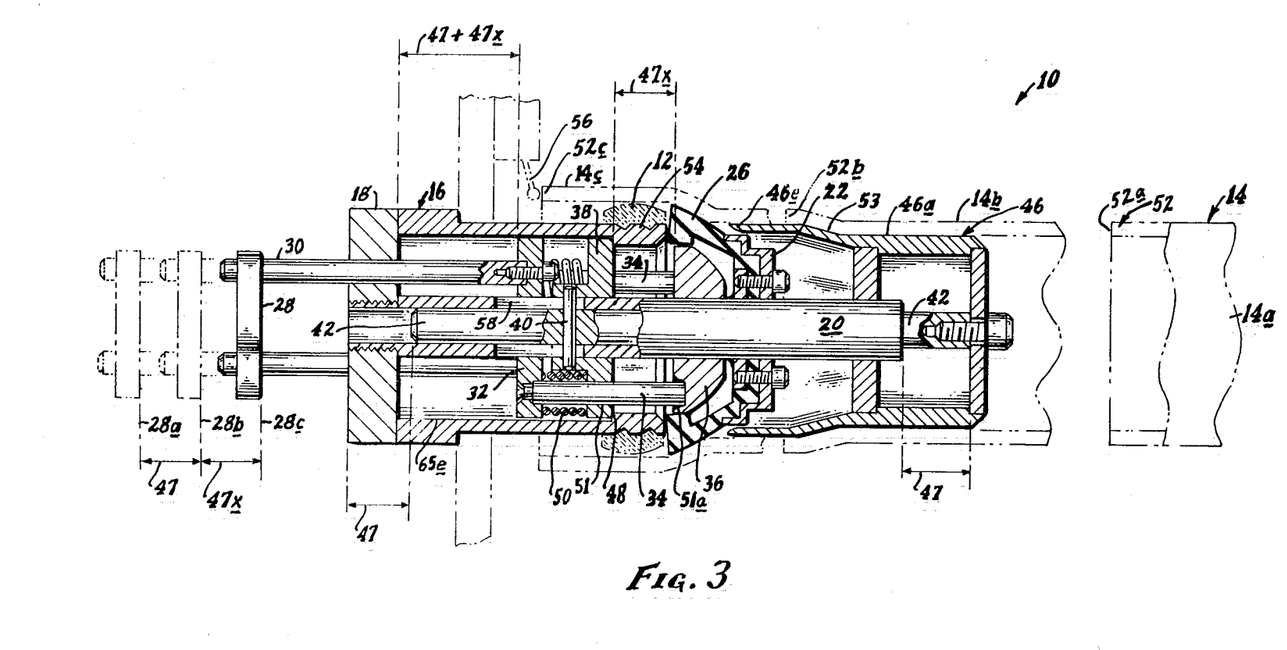
FIG. 3 is also a similar view, but of the parts in a third stage, the one set of parts still at the position of FIG. 2, but another having moved rightwardly to achieve the fully-expanded condition of an expander body.
Figure 4:
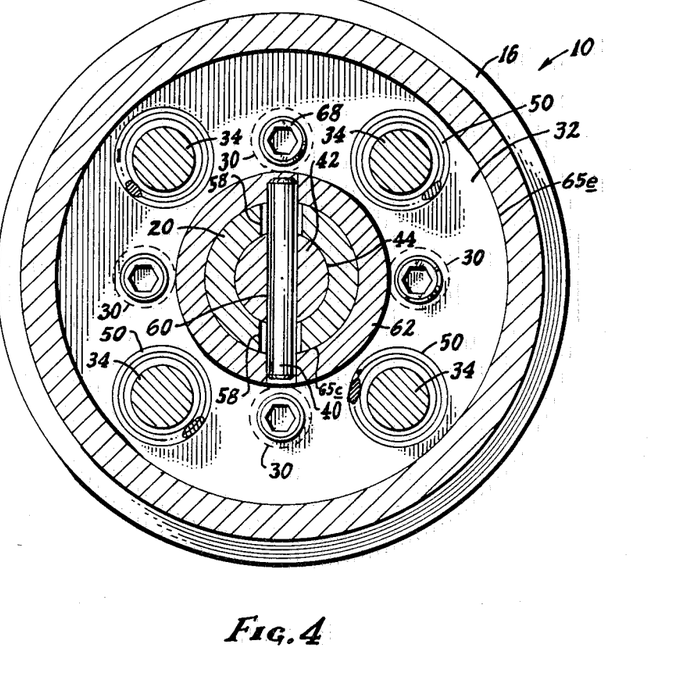
FIG. 4 is a transverse cross-sectional view generally as taken by the Section-line 4—4 of FIG. 3.

As shown in the drawings, the present invention provides an advantageous mandrel type device 10 by which a seal ring 12 (FIG. 3) is assembled as an insert into the end of a heated plastic tube or pipe 14 (also FIG. 3).

Figure 1:
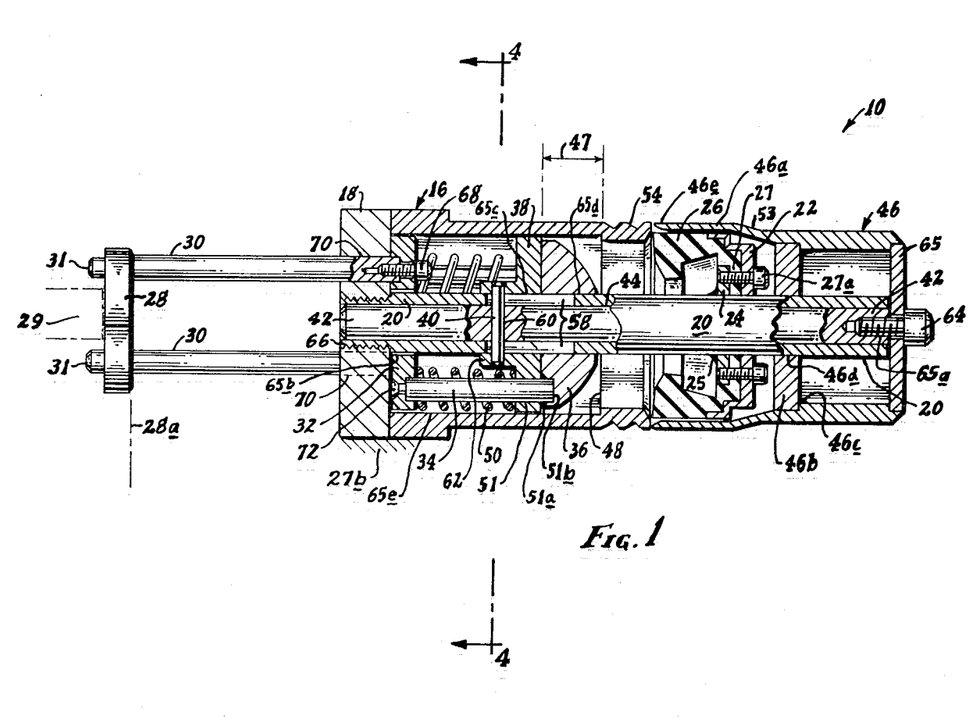
FIG. 1 is a longitudinal view of a mandrel means of the present invention, most of which is shown in longitudinal cross section, the components being here shown in a beginning stage of the work-cycle of enlarging an end portion of a tubular work object, in the operation of installing a gasket or sealing ring in a work object.

The understanding of the illustrative embodiment may probably easiest grasped by observing first the details as shown in FIG. 1, in which the device 10 is shown in its fully closed position.

As there shown (FIG. 1), the device 10 generally comprises a stationary set of certain parts, i.e., an outer and generally cylindrical frame body 16, a stationary end cap 18 (at the left end affixed by suitable connectors (not shown) to the frame body 16, a stationary outer tubular shaft 20, a retainer cup 22, a retainer mount washer 24 affixed as by a weld 25 to the shaft 20 near its right end, and a urethane shoe or plug 26 retained to the stationary assembly as by the shoe or plug's inner flange 27 held between the retainer cup 22 and its fixed mount washer 24, that sub-assembly (22, 24, 26, and 27) being shown held assembled by bolts 27a.

All of that set of components remain stationary during the entire seal ring-assembly process, as is set forth more fully herein; and it will be understood that all of this stationary set (16, 18, 20, 22, 24, 26) are suitably supported as by a support mounting schematically shown as 27b supporting the end cap 18 and frame body 16.

Other components of the device include a movable second set, comprising as here shown a pusher body 28 shown at the extreme left, even farther left than the end cap 18, the actuation movement of the pusher body 28 being shown schematically as caused by a control unit 29 indicated as acting on the pusher body 28, connecting rods 30 held as by bolts 31 to the pusher body 28, a disk 32 inwardly of end cap 18, posts 34 extending inwardly from the disk 32, and a cam pad 36, which in operativity as cyclically caused by the actuation control 29 moves forward and backward as a rigid unit, in operativity as specified herein.

A riding or movable third set of components provides a sub-assembly in the illustrative embodiment, as shown as comprising a flange member 38, a transverse pin 40, an inner shaft 42 concentric with and movably carried within the hollow bore 44 of the outer shaft member 20, and a nose cone 46 at the extreme right or free end of the device 10; and that nose cone 46, of a sort of cup shape, has its side walls 46a braced by a disk 46b, shown welded at 46c to the cone sidewalls 46a, the control opening 46d of disk 46b being supportingly slidable on the outer tubular shaft 20.

Figure 2:
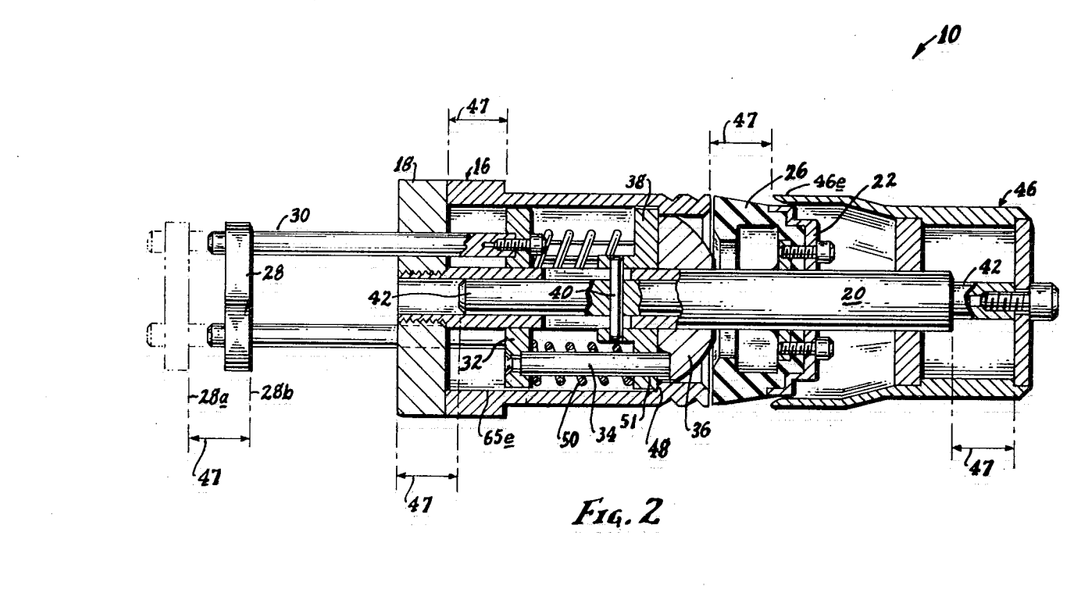
FIG. 2 is a similar view, but with the parts now in a second stage, in which one of the sets of parts has moved rightwardly to its limited position.

Those components mentioned herein as the movable third set act as another rigid unit, in the operativity as specified, movable with respect to the stationary set (16, 18, 20, 22, 24, and 26) but not as movable as the movable second set (28, 30, 32, 34, and 36) as indicated by the differences in the showings in FIGS. 1, 2, and 3, and as described herein.

More particularly, the extra mobility of the second set (28, etc.) is perhaps easiest observed in the drawings by observing the location of the pusher disk 28 in the various FIGS. 1-3, in comparison to the location of the stationary end cap 18.

That is, FIG. 1 shows the pusher disk 28 at position 28a, at the beginning of the cycle; FIG. 2 shows disk 28 having moved from that original position 28a a distance shown by dimension 47 to an intermediate position 28b; and FIG. 3 shows disk 28 having now moved in a second stage of movement shown by dimension 47x even further rightwardly to position 28c.

And, in contrast to that two stages of movement (47 and 47x) of the movable second set (28, etc.) the movement of the movable third set (38, 42, etc.) is easily seen to be only of a one stage of movement, by noticing that while in FIG. 1 the left end of inner shaft 42 is adjacent the left face of end cap 18, its movement as shown in both FIGS. 2 and 3 is to only the same place inwardly of that left face of end cap 18, that distance of movement being noted as distance-line 47. The distance 47x (FIG. 3) which represents the second stage of movement of the movable second set (28, etc.) may be, but not necessarily is, the same as dimension 47, depending on factors relating to radially outward movement of the shoe 26 in operativity specified further herein.

The movable third set of components (38, 40, 42, and 46) are caused by means shown below to move forward and backward as cyclically caused by control actuation unit 29, with the components mentioned above as the movable second set (i.e., the components 28, 30, 32, 34, and 36), except, however, components of the movable third set (38, 40, 42, and 46) all more limited in their travel (i.e., to only movement-distance 47), by an inner shoulder 48 of the frame body 16, the shoulder 48 being shown as facing leftwardly, and abutingly being engaged by the flange 38 (FIG. 2) after a limited (47) amount of travel of the flange 38 and components 40, 42, and 46 of its set.

The difference in travel (the dimension 47x) between that of the movable second set (28, 30, 32, 34, and 36) and that of the movable third set (38, 40, 42, and 46) is taken up by springs 50 which are shown as sleeved around the posts 34. Those springs 50 bottom (at their left ends) against the pressure disk 32, and push (by their right ends) against the flange member 38; and thus, when the flange member 38 abuts the shoulder 48 to stop the rightward movement of the movement of the movable third set of members (38, 40, 42 and 46), the springs 50 become compressed (FIG. 3) as the pressure disk 32 (and the other components of the movable second set 28, 30, 32, 34, and 36) continue to move rightwardly (to the FIG. 3 showing) as caused by actuator 29.

Turning to FIG. 2, it will be seen that each set of the movable sets of components, i.e., the movable second set (28, 30, 32, 34, and 36) and the movable third set (38, 40, 42, and 46) have moved forwardly (rightwardly as shown) a distance 47, together, until the flange 38 is stopped by the abutment shoulder 48. (Relative movement of the two movable sets (28, etc., and 38, etc. ) is permitted by the holes 51 in flange member 38 being large enough to slidably accommodate the posts 34.) At this FIG. 2 point, and at this stage of operativity, that is of flange 38 engaging shoulder 48 after movement of the distance 47, the nose cone 46 has moved rightwardly or outwardly relative to the stationary set of components (16, 18, 20, etc.), and is separated as shown from body 16 by that forward (rightward) movement, exposing the urathane shoe or plug 26 which in the initial stage (FIG. 1) had been covered by the nose cone side walls 46a.

FIG. 3 shows the rigid sub-assembly noted above as the movable second set (28, 30, 32, 34, and 36) having continued to move forwardly (rightwardly) while the rigid sub-assembly noted as the movable third set (38, 40, 42, and 46) remains at rest, due to the abutment of flange 38 and shoulder 48, thus compressing the springs 50.

Although the pusher body 28 and its connecting rods 30 and pressure disk 32 provide all the actuation in the embodiment shown (except the operativity of placing a sealing ring 12 on the frame body 16 and the two-way travel of the tube or pipe work-piece 14), the two movable sets (28, etc., and 38, etc.) are thus seen to be themselves relatively movable with respect to one another by the fact that although there is the said abutment of the flange member 38 with abutment flange 48, the continued movement of the posts 34 keeps pushing the camming pad means 36 after flange 48 abuts the flange 38 to stop the third set (38, etc.) movement.

Until that abutment at 38/48, the movement of the camming means 36 had been both by direct push from the posts 34 which are shown welded at 51a into the seats 51b on the left face of the camming means 36, and by the force of the springs 50 pushing on the flange member 38, which until the FIG. 2 position is reached (with its 38/48 stoppage of the movement of the 3rd set (38, etc.) had been disposed against the camming body means 36.

As the sub-assembly noted as the movable second set (28, 30, 32, 34, and 36) continues to move forwardly (rightwardly) into the FIG. 3 position, the cam pad 36 contacts the urethane plug 26 causing it, i.e., the urethane expander plug 26, to expand radially outwardly. This is the specific action that achieves the pipe-expansion, as noted in FIG. 3.

The expander means 36 is desirably of a cup-like shape, circumferentially-continuous; and when expanded radially outwardly (by camming pad means 36 in the form shown) the expander means presents an outwardly-flaring circumferential contour which extends radially outwardly from the diameter of the pipe 14 after the initial flaring mentioned below, causing the subsequent greater expansion to receive the gasket or seal ring 12, as further specified below as to the illustrative embodiment.

At this FIG. 3 time or stage of operation, the leading (left) end 52 of the heated plastic tube 14 (the tube 14 being shown by sequential stages as it sequentially moves leftwardly, by reference numerals 14a and 52a indicating an initial position of parts 14 and 52, and 14b and 52b indicating an intermediate position, and 14c and 52c indicating a farther advanced position of the pipe 14 and its leading end 52) as the pipe 14 and its leading end is forced over the nose cone 46; and first this causes the end 52 of the plastic tube 14 to expand, initially as is noted by comparing the showings of 52a and its intermediate showing 52b of the pipe showing 14b, due to the smoothly flaring conical enlargement 53 in the sidewalls 46a of the nose cone 46, over which tapered portion 53 the pipe end 52 forcefully passes in its relatively leftward travel onto the device 10.

As the pipe or tube 14 is forced further over the nose cone 46, i.e., leftwardly toward the showing 14c and 52c of the pipe 14 and its leading end 52, the leading tube-edge 52 contacts the now-expanded urethane plug 26, this being at a stage of travel of the tube 14 between its position 14b and 14c.

As the tube 14 is then forced further leftwardly, the urethane plug 26 causes the end 52 of the plastic tube 14 to expand further so it will receive the seal 12. (It will of course be understood that the seal 12 will have been already placed (leftwardly) onto the frame 16 to the location shown in FIG. 3 where it has been held by the grooves 54, waiting for the passing over it, into the FIG. 3 position 52c, of the leading end edge 52 of the pipe 14 into which the seal 12 is being received.)

In the form shown (FIG. 3), the leading end 52 of the tube 14 is pushed further leftwardly until it (now at position shown by its reference numeral 52c) abuts against a micro-switch 56 or some other suitable stop-control device.

Slots 58 in the outer shaft 20 accommodate the pin 40 and its travel of the dimension 47, and allow the rigid connection between the inner shaft 42 and the flange 38, the pin 40 passing through a diametrical hole 60 in the inner shaft and into a cylindrical boss 62 of the flange member 38.

At the outer (right) end of the device 10, the inner shaft 42 is shown held to the hollow nose cone 46 by a cap screw 64 which bears on the end cap plate 65 at the outer end of the cone's cylindrical sidewalls 46a, the screw 64 engaging into a threaded opening 65a extending inwardly from the outer end of the inner shaft 42. (In the initial position of the parts (FIG. 1), that nose-cone cap 65 is shown as touching the outer end of outer tubular shaft 20, but it is not connected thereto.)

At the inner (left) end of the device 10, the outer shaft 20 in which the inner shaft 42 is slidable is shown fixed to the end cap 18 by a threaded connection 66 therewith.

The tubular shaft 20 is slidable with respect to central holes 65b in disk 32, 65c in flange member 38 (62), and 65d in pad means 36, respectively; and those members (disk 32, flange member 38, and pad means 36) are of course slidable within the bore 65e of the frame body 16.

Disk 32 is connected to the connecting rods 30 by cap screws 68, but the connecting rods 30 are slidable as to the end cap 18 by being slidable in holes 70 of the end cap 18.

The posts 34 are held to the disk 32 by screws 72; and when the posts 34 are pushed forwardly (rightwardly) by the force-disk 32 being moved rightwardly by the connecting rods 30 receiving force from the pusher 28, the posts 34 push the pads 36 forwardly (rightwardly) past the FIG. 2 location in which they had been moved (by the force of the disk 32 acting through springs 50 onto flange member 38) until the flange member 38 is stopped by the shoulder 48.

As the pads 36 continue to thus move rightwardly, past the FIG. 2 position, they (the pads 36) engage the left and inner portions of the shoe 26, camming them outwardly to the expanded FIG. 3 position in which they provide the outward shoulder which forces the tube end 52 from its 52b diameter to its larger 52c diameter to accept the seal ring 12.

In the embodiment shown, all the components are disposed and move axially except as stated the pin 40 and its hole 60 in shaft 42 are transverse, and the grooves 54 are circumferential, and the movement of the shoes 26 is radially outwardly. Thus, axially disposed are the components 14, 16, 20, 22, 24, 26, 30, 31, 32, 34, 36, 38, 42, 44, 46, 46a, 46d, 50, 58, 64, 66, 68, 70, and 72; and the movements 47 and 47x of the movable second set (28, etc.) and the movable third set (38, etc.) are axial, as is the movement of the workpiece pipe or tube 14 and its leading end 52.

Gaskets or seal rings 12 are available in various sizes and cross-sectional shapes; and thus it will be understood that the particular size and contour of the expander shoe or plug means 26 may be altered as necessary to correspond with the specifications of the gasket being used, thus to provide the desired nature such as size and/or shape of the deformation of the end-portion 52 of the workpiece pipe 14 in position 14c desired to retain the particular seal 12 being used; for, as the plug means 26 is forced outwardly by the camming effect of the pad 36, the expander plug means 26 acts as a spinning tool achieving the pipe-enlargement indicated by the pipe-condition noted as 14c. And consideration in that regard should also be given to the pipe size (for pipe sizes from two inches to twelve or more inches can be provided with seal rings by a device of this invention).

Similarly the depth or axial length of the enlarged outer end portion 42c of the pipe after enlarging by the shoe means 26 depends on how far is the axial distance between the shoe means 26 and the limiting abutment here shown as the arm of the micro switch 56.

After the tubular workpiece 14 has been fully processed by moving to the extreme (leftward) position inwardly of the mandrel device 10, i.e., to position of 14c, it will be understood that the control means 29 now starts to move the movable second set (28, etc.) inwardly (leftwardly) of the mandrel 10, reversing the cycle.

This leftward movement of the movable second set (28, etc.) pulls on the camming pad means 36 (by force through 28, 30, 68, 32, 72, 34, and 51a) causing the camming pad means 36 to move in a first stage of movement to the FIG. 2 position; and during this movement from the FIG. 3 position to the FIG. 2 position (a distance of the dimension 47x) nothing acts on the movable third set (38, etc.) to cause that third set to move leftwardly; but the withdrawal of the camming effect of the cam pad means 36 permits the expander shoe means 26 to move inwardly by its own resilience. That resilience, however, is not enough to assure free clearance of the seal 12 as the pipe 14 is withdrawn from the mandrel 10.

Continued leftward movement of the movable second set (28, etc.) then causes those camming pad means 36 to push inwardly (leftwardly) on the flange member 38 of the movable third set (38, etc.), thus acting through pin 40 and inner shaft 42 to pull the nose cone 46 leftwardly; and (noticing particularly FIG. 3) leftward movement of the nose cone 46 at this stage (in which the outward camming effect of pads 36 has been relieved by leftward movement of the pads 36) causes the leading (left) or free edge-portion 46e of sidewalls 46a of the nose cone 46 to forcefully cam the expander shoe means 26 radially inwardly, freeing the space in that region so that the sealing ring 12 can pass by during the removal of the tube 14, i.e., the location axially outwardly of the seal 12 and radially outwardly of the cone sidewalls 46a whose diameter is the tube 14 diameter axially outwardly of the location at the grooves 54 of frame 16, at which the tube's sealing ring 12 is fitted into the pipe 14.

It may appear in FIG. 2 that the expander shoe means 26 will have already moved fully radially inwardly enough that the pipe-carried seal ring 12 could pass by that location without the interference necessitating the inward-camming effect of cone-edge 46e just mentioned, but that apparent factor is because FIG. 2 is drawn at an intermediate stage to illustrate sequentially from FIG. 1, in the stage prior to FIG. 3 condition in which the expander means 26 has been cammed outwardly; and thus FIG. 2 does not show the expander means 26 as even protruding at all from the inner position of FIG. 1, as it would do by its own nature unless forced back inwardly as is achieved by the camming effect, of edge 46a as described above, for as mentioned above the resilience or "springback" of the expander shoe means 36 (even of a circumferentially continuous cup shape as shown and desired) is not sufficient to assure clearance for the seal 12 during removal of the pipe 14 from the 14c position.

After the control means 29 has thus acted (through the second set (28, etc.) and the third set (38, etc.) to pull the nose cone 46 leftwardly to exert the camming effect of edge 46e as the nose cone 46 moves toward the FIG. 1 position of the mandrel cycle, means (not shown) can pull the pipe or tube workpiece 14 rightwardly off the mandrel 10.

SUMMARY

The construction and operational concepts may now be summarized as to overall effect and achievement as a mandrel device 10 for guiding a pipe or tube work object 14, along walls 46a of a nose cone 46, to a location such that the tube's end 52 is inwardly at 52c against a stop 56, which is a portion inwardly past a location at which an expander body 26 of the mandrel 10 is cammed, by force of a camming body 36, outwardly to achieve a tube-enlargement as to the tube 14 so as to receive a gasket or sealing ring 12; and subsequent inward camming by the nose-cone edge 46e is achieved, together with a withdrawal of the outwardly-forcing cam body 36, to cam the expander body 26 inwardly to permit withdrawal or release of the tube 14 now fitted with the sealing ring 12, past the location where the expander body 26 had been disposed and which in its outward position would interfere with passage of the seal 12.

A summary in more conceptual and component-operativity detail is now presented, as follows:

The frame body means 16 and its end cap 18 are supported by a suitable mounting 27b; and the pipe or tube work obJect 14 will enter onto the device over the outer nose 46 which provides a guide means whose surface is operatively cylindrical, concentric with the axis of the mandrel means, for slidably receiving the pipe or tube 14.

Means (not shown) will push the pipe or tube 14 leftwardly to a locator abutment means which defines how far onto the mandrel means the work object 14 may be slid, and subsequently withdrawn after being enlarged and having received a gasket or sealing ring 12.

A circumferentially-extending expanding shoe means is provided by the urethane expander cup 26 whose walls are radially movable with respect to the frame 16 and to the guide nose 46; and the expander 26 is axially fixed with respect to the frame 16 by being fixedly supported by the support tube 20.

Actuation, for both camming the expander body 26 radially outwardly and subsequently radially inwardly is provided by movable force means 28, which is powered by control 29 and movable with respect to the frame body 16 and to the framed support tube 20.

A outward camming effect is provided by movable actuation means 36 which are powered by the force means 28, and operative to provide the camming effect to cause the expanding shoe means 26 to move radially outwardly to a radially outward position where it is outwardly of the diameter of the pipe 14; and thus, when the pipe 14 is pushed against the expanded shoe 26, the pipe 14 receives an enlargement of the desired size and nature to receive the gasket or sealing ring 12 in that enlarged portion of the pipe.

For operativity prior to and enabling the release or withdrawal of the pipe 14, there are provided retraction means 46e which have an inwardly camming action to cause the expanding shoe means 26 to retract radially inwardly to accommodate the release of the pipe or tube work object 12; for since the pipe 12 is then carrying inwardly of its enlargement the gasket or sealing ring 12 the release from the mandrel would be otherwise blocked by the expanding shoe means 26 if then remaining in its radially outward position. (Of course the urethane 26 has some "spring back" resilience, but not enough to assure clearance of the seal 12 as the pipe is being withdrawn.)

The inner shaft 42 provides actuator means which move the retraction means 46e to a retracted (rightward) position prior to the cam pads 36 causing the outward movement of the expanding shoe means 26, and that retracted position of the retraction means 46e is far enough outwardly, as shown in FIGS. 2 and 3, that the expanding shoe means 26 are permitted to move to their radially outward position operative to achieve the desired pipe enlargement shown for the pipe at position 14c of FIG. 3.

The inner shaft 42 also provides the function of moving the retraction means 46e leftwardly as noted above for removing the blocking effect thereof against release movement of the seal ring 12.

The moving means 28 provides its power through connecting rods 30 and a disk 32 just inside the end cap 18 and which is movable with respect to the support tube 30 and to the frame body 16, and the powered movement of the disk 32 by mover 28 operatively applies force to the cam pads 36 to cause the camming actuation of the expanding shoe means 26 to move toward the radially outward position to achieve the pipe-enlarging operativity.

The disk means 32 is movable with the said actuator shaft 42 throughout a portion of its movement relative to the support tube 30 and the frame body 16, but also is relatively movable with respect to the actuator shaft 42 during a subsequent stage of the actuator shaft 42 during a subsequent stage of the movement of the disk; and it is during that subsequent stage of its movement that it acts in response to the mover 28 to operatively apply the force to the cam pads 36 to achieve the radially outward movement of the expanding shoe means 26.

That duality of movement is achieved by abutments which include a first abutment 48 on the frame body 16, and shaft 42 is provided with a second abutment by its connection by pin 40 to a flange member 38, the latter after a first stage of movement providing abutting engagement of the frame abutment 48 to block further rightward movement of the actuator shaft 42; but the relative movability of the disk 32 and the actuator shaft 42 permits the disk 32 to provide its operativity during the subsequent stage of its movement, that being its continued pushing effort, through posts 34, to apply force to the cam pads 36.

Strength, compactness, and good operability are provided by providing that the actuator means and the support are provided by a tubular member and a shaft, the two being relatively slidable with respect to one another, and particularly as shown as the actuator means being the shaft 42 and the support being the tubular member 20. Both the disk 32, the flange member 38, and the cam pad 36 have central openings receiving and being relatively slidable with respect to the tubular shaft 20 exteriorly thereof; and the inner shaft 42, which is referred to herein as the actuator, is slidable interiorly of the tubular support tube 20.

The flange member 38 also serves the additional function of an actuating means fixed by pin 40 relative to the inner actuator shaft 42, and is both actuated by but movable with respect to the movable force means 18. As actuating means for the shaft 42, the flange member 38 is operative to move the actuator shaft 42 to move it in its controlled movement of the retraction means 46e in both directions, i.e., to a retracted (rightward, FIGS. 2 and 3) position and to a cam-operational (leftward, FIG. 1) position.

The spring means 50 is operatively interposed between the actuating means 38 and the mover body 28, urging movement of the flange member 38 to be in accordance with that of the mover 28, but yieldable to permit the said relative movement described herein.

The spring 50 bottoms against the disk 32, rather than against the mover body 28 itself, increasing the characteristic of the moving parts being generally within the mandrel.

It is thus seen that a mandrel device for achieving an enlargement of a pipe or tube work object, and applying a gasket or sealing ring in the enlargement, according to the inventive concepts, provides a desired and advantageous device of novel and advantageous features with parts providing both co-ordinated and plural-function operativity, as detailed herein.

Accordingly, it will thus be seen from the foregoing description of the invention according to this illustrative embodiment, considered with the accompanying drawings, that the present invention provides new and useful concepts of a novel and advantageous mandrel device for enlarging a pipe and affixing a seal ring therein, providing the advantages of that operativity, adaptable to various sizes of the tubular work object, ease of use and of satisfactory service life, the moving parts being generally internal, compactness, plural function of components, etc., thereby providing utility from various standpoints such as pointed out herein yielding desired advantages and characteristics, and accomplishing the intended objects, including those hereinbefore pointed out and others which are inherent in the invention.

Modifications and variations may be effected without departing from the scope of the novel concepts of the inventions; accordingly, the invention is not limited to the specific embodiment or form or arrangement of parts herein described or shown.

I claim:

1. Mandrel means for producing an interior enlargement for retaining a gasket or sealing ring in a pipe or tube work object, comprising, in combination:
    a frame body means;
    an outer nose which provides guide means, the outer surface of which is operatively cylindrical and provides a guide means generally concentric with the axis of the mandrel means, for slidably receiving therealong an end portion of the pipe or tube;
    a circumferentially-extending expanding shoe means which is radially movable with respect to the frame body means and to the guide means, and is axially fixed with respect to the frame body means;
    support means fixedly supported by the frame body means and providing support for the expanding shoe means;
    movable force means movable with respect to the frame body means and to the support means;
    movable actuation means, which are responsive to to movement of the movable force means, and operative to cause the expanding shoe means to move radially outwardly to a radially outward position to engage a pipe or tube work object for achieving an enlargement of the pipe or tube work object to receive the gasket or sealing ring in said enlarged portion;
    and retraction means which cause the expanding shoe means to retract radially inwardly to accommodate the release from the mandrel means of the pipe or tube work object then carrying inwardly of its enlargement the gasket or sealing ring whose release from the mandrel means would be otherwise blocked by the expanding shoe means if then remaining in its said radially outward position.

2. The invention as set forth in claim 1, in a combination in which actuator means are provided which move the said retraction means to a retracted position prior to the movable actuation means causing the said outward movement of the expanding shoe means, the retracted position of the retraction means being such that the expanding shoe means are permitted to move to the said radially outward position.

3. The invention as set forth in claim 2, in a combination in which there is also provided disk means which is movable with respect to the support means and to the frame body means;

the disk means being movable with the said actuator means throughout a portion of its movement relative to the support means and the frame body means but relatively movable with respect to the said actuator means during a subsequent stage of its movement, and during that subsequent stage of its movement it acts in response to the movable force means to operatively apply force as aforesaid to achieve radially outward movement of the expanding shoe means.

4. The invention as set forth in claim 3, in a combination in which the frame body means is provided with a first abutment, and the actuator means is provided with a second abutment;

and the abutting engagement of the said first and second abutments blocks movement of the actuator means, but the relative movability of the disk means and actuator means permits the disk means to provide its said operativity during the subsequent stage of movement.

5. The invention as set forth in claim 4, in which the support means and the actuator means comprise a tubular member and a shaft, the two being relatively slidable with respect to one another.

6. The invention as set forth in claim 4, in a combination in which there is also provided an actuating means, actuated by but movable with respect to the movable force means, and operative to move the actuator means to move the retraction means;

and there is a spring means operatively interposed between the actuating means and the movable force means, but yieldable to permit the said relative movement thereof; and the said spring means operatively bottoms against the said disk means to be responsive to the said movable force means.

7. The invention as set forth in claim 6, in which the support means and the actuator means comprise a tubular member and a shaft member, the two being relatively slidable with respect to one another; and the said disk means has an opening through which the tubular member passes and is relatively slidable with respect thereto.

8. The invention as set forth in claim 7, in a combination in which the actuator means is the shaft member and the support means is the tubular member, the actuator member being slidably carried within the tubular member, the tubular member being provided with a slot means in its wall;

and there is provided a pin means extending through the slot means, relatively movable with respect to the tubular member, and operatively interconnecting the actuator member and the actuating means.

9. The invention as set forth in claim 3, in which the support means and the actuator means comprise a tubular member and a shaft, the two being relatively slidable with respect to one another.

10. The invention as set forth in claim 3, in a combination in which there is also provided an actuating means, actuated by but movable with respect to the movable force means, and operative to move the actuator means to move the retraction means;

and there is a spring means operatively interposed between the actuating means and the movable force means, urging movement of the actuating means to be in accordance with that of the movable force means, but yieldable to permit the said relative movement thereof; and the said spring means operatively bottoms against the said disk means to be responsive to the said movable force means.

11. The invention as set forth in claim 10, in which the support means and the actuator means comprise a tubular member and a shaft member, the two being relatively slidable with respect to one another; and the said disk means has an opening through which the tubular member passes and is relatively slidable with respect thereto.

12. The invention as set forth in claim 11, in a combination in which the actuator means is the shaft member and the support means is the tubular member, the actuator member being slidably carried within the tubular member, the tubular member being provided with a slot means in its wall;

and there is provided a pin means extending through the slot means, relatively movable with respect to the tubular member, and operatively interconnecting the actuator member and the actuating means.

13. The invention as set forth in claim 2, in which the support means and the actuator means comprise a tubular member and a shaft, the two being relatively slidable with respect to one another.

14. The invention as set forth in claim 2, in a combination in which there is also provided an actuating means fixed relative to the actuator means, actuated by but movable with respect to the movable force means, and operative to move the actuator means to move the retraction means;

and there is a spring means operatively interposed between the actuating means and the movable force means, urging movement of the actuating means to be in accordance with that of the movable force means, but yieldable to permit the said relative movement thereof.

15. The invention as set forth in claim 2, in a combination in which the actuator means also provide the function of actuating the retraction means to retract the expanding shoe means.

16. The invention as set forth in claim 15, in a combination in which there is also provided an actuating means fixed relative to the actuator means, actuated by but movable with respect to the movable force means, and operative to move the actuator means to move the retraction means;

and there is a spring means operatively interposed between the actuating means and the movable force means, urging movement of the actuating means to be in accordance with that of the movable force means, but yieldable to permit the said relative movement thereof.

17. The invention as set forth in claim 1, in a combination in which there is also provided disk means which is movable with respect to the support means and to the frame body means, the movement of the disk means being responsive to movement of the movable force means to operatively apply force to the movable actuation means to cause its said actuation of the expanding shoe means to move toward radially outward position.

18. The invention as set forth in claim 17, in a combination in which there is also provided an actuating means, actuated by but movable with respect to the movable force means, and operative to move the actuator means to move the retraction means;

and there is a spring means operatively interposed between the actuating means and the movable force means, urging movement of the actuating means to be in accordance with that of the movable force means, but yieldable to permit the said relative movement thereof; and the said spring means operatively bottoms against the said disk means to be responsive to the said movable force means.

19. The invention as set forth in claim 18, in which the support means and the actuator means comprise a tubular member and a shaft member, the two being relatively slidable with respect to one another; and the said disk means has an opening through which the tubular member passes and is relatively slidable with respect thereto.

20. The invention as set forth in claim 19, in a combination in which the actuator means is the shaft member and the support means is the tubular member, the actuator member being slidably carried within the tubular member, the tubular member being provided with a slot means in its wall;

and there is provided a pin means extending through the slot means, relatively movable with respect to the tubular member, and operatively interconnecting the actuator member and the actuating means.

21. The invention as set forth in claim 1, in a combination in which the expanding shoe means is a cup-shaped member of resilient material having sidewalls and an intermediate wall, the said intermediate wall being affixed to the support means; and the actuation means are operative to cause the said radially outward movement of the expanding shoe means by a camming operativity operably against the side walls thereof.

* * * * *

UNITED STATES PATENT AND TRADEMARK OFFICE
CERTIFICATE OF CORRECTION

PATENT NO. : 4,597,149
DATED : July 1, 1986
INVENTOR(S) : Robert J. Lee

It is certified that error appears in the above-identified patent and that said Letters Patent is hereby corrected as shown below:

Col. 2, l. 60  There should be a closure of parentheses after "end". (2nd occurr.)

Col. 3, l. 28  The word "control" should be "central".

Col. 3, l. 36  There should be no period after "differences".

Col. 8, l. 37  There should be a comma after "inwardly".

Col. 8, l. 40  The word "framed" should be "fixed".

Col. 10, l. 34  The words "I claim" should be "CLAIMS".

Signed and Sealed this

Seventh Day of October, 1986

[SEAL]

Attest:

DONALD J. QUIGG

Attesting Officer

Commissioner of Patents and Trademarks